Figure 1:
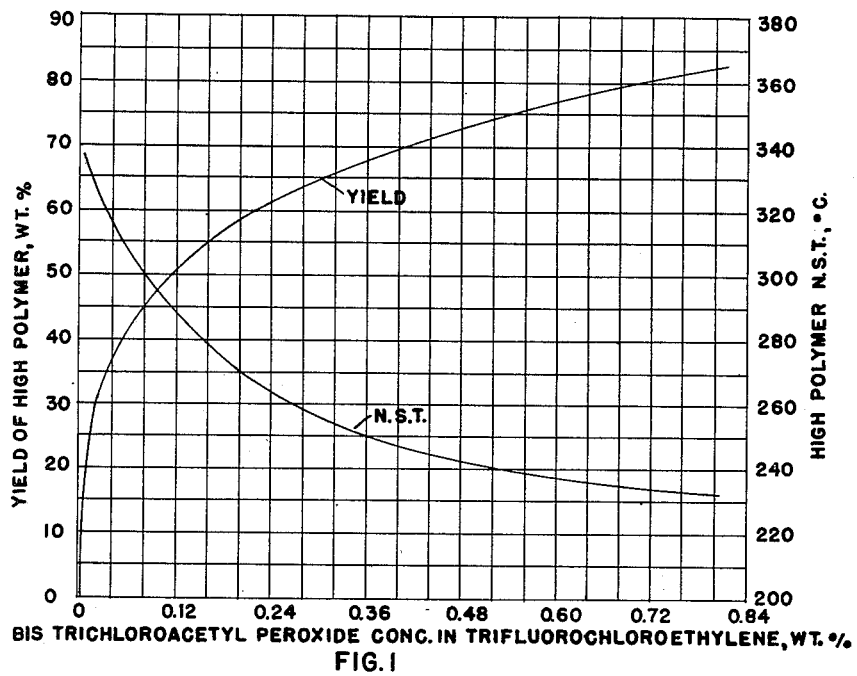

INVENTORS
OSCAR A. BLUM
ALBERT L. DITTMAN
BY JOHN M. WRIGHTSON
ATTORNEYS

CONCENTRATION OF TRICHLOROACTYL PEROXIDE WT. %
INDICATED ON CURVES IN BOTH FIGURES

INVENTORS
OSCAR A. BLUM
ALBERT L. DITTMAN
JOHN M. WRIGHTSON
BY E. F. Liebrecht
Cruzan Alexander
ATTORNEYS United States Patent Office 2,694,701
Patented Nov. 16, 1954

2,694,701

MANUFACTURE OF PERHALOGENATED POLYMERS UNDER CONTROLLED CONDITIONS

Oscar A. Blum, Bayonne, Albert L. Dittman, Jersey City, and John M. Wrightson, North Bergen, N. J., assignors to The M. W. Kellogg Company, Jersey City, N. J., a corporation of Delaware Application April 21, 1950, Serial No. 157,268

14 Claims. (Cl. 260—92.1)

This invention relates to the manufacture of perhalocarbons. In one aspect this invention relates to the manufacture of perhalocarbon plastics. In another of its aspects this invention relates to the manufacture of perhalocarbon oils of intermediate boiling range. Further in this latter aspect this invention relates to a method for stabilizing perhalocarbon oils. In one of its more particular aspects this invention relates to a process for the polymerization of perfluoro-olefins and perfluorochloro-olefins to produce perhalocarbon oils, greases and waxes and the subsequent cracking of these materials to produce oils of lower molecular weight and boiling range followed by halogenation of the cracked product to stabilize same. Particularly, the invention relates, among its aspects, to the controlled polymerization of trifluorochloroethylene to produce predetermined specific products.

Normally liquid and solid perhalocarbons are produced by polymerization of a monomer in the presence of a suitable promoter and, in the case of liquids, also a chain transfer solvent. Under appropriate conditions of temperature and promoter, trifluorochloroethylene polymerizes to chemically and physically stable liquid and solid polymers having a variety of uses. We have found that it is of utmost importance, from the standpoint of yield, selectivity and stability of product, to control the concentration of the active ingredients of the polymerization mixture within selected narrow limits at all times during the polymerization reaction.

The object of this invention is to polymerize perhalo-olefins under controlled conditions to produce a selected product of increased stability and yield.

Another object is to provide a reliable method for producing perhalocarbon plastics of predetermined chemical and physical characteristics.

It is an object of this invention to provide a process for the production of perhalocarbon oils within an intermediate boiling range in high yields.

Another object of this invention is to provide a method for increasing the chemical and physical stability of cracked perhalocarbon oils.

Another object is to provide a method for the production of a stabilized polytrifluorochloroethylene oil of an intermediate boiling range by a more economical method than heretofore employed.

Various other objects and advantages of the present invention will become apparent to those skilled in the art from the accompanying description and disclosure.

As herein employed, perhalocarbons are defined as compounds consisting substantially exclusively of carbon and halogen with any degree of saturation and containing only negligible amounts of other elements such as hydrogen and oxygen in a quantity less than about 2 weight per cent as impurities. These other elements are derived from materials utilized in the process, as will hereinafter become apparent. Perfluoro-olefin is defined as a perhalo-olefin with any degree of unsaturation consisting of fluorine and carbon, and a perfluorochloro-olefin is defined as a perhalo-olefin consisting of fluorine, chlorine and carbon. The preferred perfluorochloro-olefins of this invention are those containing not more than one chlorine atom per atom of carbon.

In accordance with this invention a perfluoro-olefin or a perfluorochloro-olefin, such as trifluorochloroethylene, tetrafluoroethylene, perfluorobutadiene, difluorodichloroethylene including both $CF_2=CCl_2$ and $CFCl=CFCl$, perfluoropropene, perfluoromonochloropropene, perfluorobutene, perfluoromonochlorobutene, etc., is polymerized or copolymerized under controlled conditions such that oils and greases at normal atmospheric temperatures and waxes, including hard waxes having softening points extending up to about 200° C., and normally solid material of the nature of thermal plastics are produced in high yields with good selectivity for the desired product.

In the polymerization of trifluorochloroethylene, to which this invention has particular application, to produce normally solid materials of the nature of thermal plastics, the concentration of promoter employed is a major factor in determining the molecular weight and characteristics of the solid product. For a selected concentration of promoter employing appropriate conditions of temperature and residence time, a solid product of definite chemical and physical characteristics is produced. For example, the polymerization of trifluorochloroethylene at a temperature of about −17° C. with varying concentrations of trichloroacetyl peroxide as the promoter produces a product of different characteristics for each different concentration of promoter as shown in the accompanying Figure 1 of the drawings. Figure 1 is a plot of promoter concentration versus N. S. T. of the solid product and versus yield of solid polymer. The N. S. T. value is the no strength temperature of the solid.

A no strength temperature (N. S. T.) of between about 200 and about 350° C. is characteristic of a normally solid polymer of the above preparation having plastic characteristics. Best plastic characteristics of the normally solid polymer are observed at N. S. T. values between about 240 and about 340.

The no strength temperature (N. S. T.) is determined in the following manner: A sample of polytrifluorochloroethylene is hot pressed into a $\frac{1}{16}$" thick sheet and cut into a strip of $\frac{1}{8}$" x $\frac{1}{16}$" x $1\frac{5}{8}$". The strip is notched $\frac{5}{8}$" from the top so that the dimension at the notch shall be $\frac{1}{16}$" x $\frac{1}{16}$". A fine wire and a standard weight is attached to one end of the strip. The weight of the polymer plus the wire and standard weight shall equal $\frac{1}{2}$ gram. The strip is then attached in a furnace and fixed vertically therein. The temperature of the sample is increased at a rate of about $1\frac{1}{2}$° C. per minute in the furnace as the breaking temperature is approached. The no strength temperature is the breaking temperature of the sample. Differences of about 5° C. are considered significant.

In the operation of a polymerization process for producing plastics, the initial concentration of trichloroacetyl peroxide promoter is selected according to Figure 1 of the drawings to correspond to the desired N. S. T. value of the solid product. This having been done, the promoter concentration is not permitted to vary more than 10 per cent from the selected initial concentration at any time during the polymerization. It is permissible and sometimes unavoidable to allow the concentration of promoter to vary more than the above limits, but such variation should be only for a relatively short period of time and in no instance more than 5 per cent of the polymerization reaction time, which polymerization time is often a matter of hours, depending to some extent upon the temperature and promoter employed. Thus, for a polymerization which takes about 30 hours to give the desired yield, the promoter should be within 10 per cent of the initial selected concentration at all times, if possible, and under no circumferences should the promoter concentration vary beyond the critical limit beyond a period of about one and a half hours of the polymerization.

Figure 2:
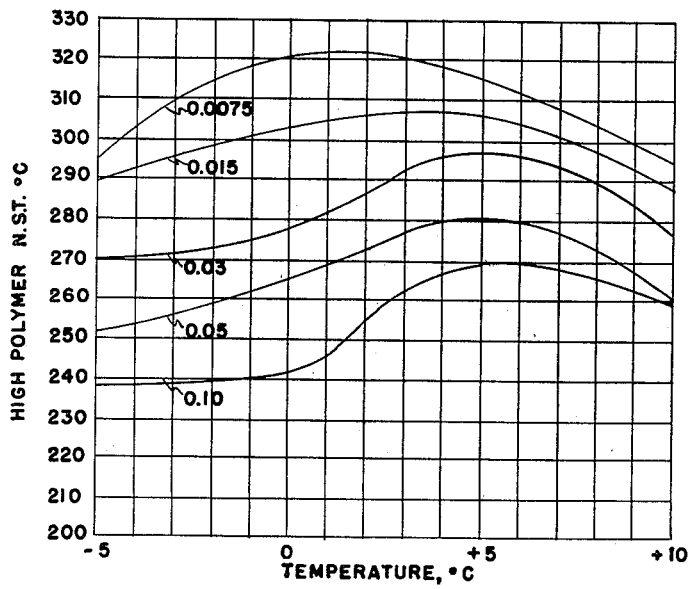
Figure 3:
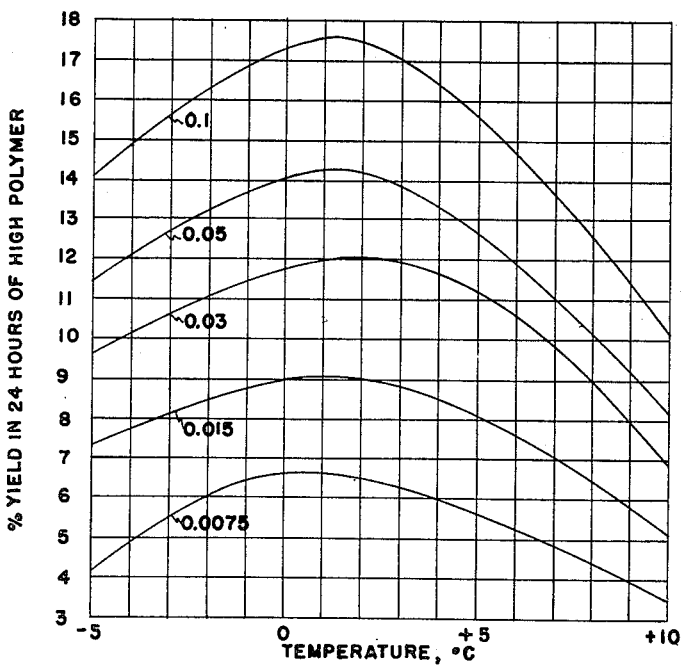

Figures 2 and 3 of the drawings illustrate the effect of temperature on N. S. T. value of the plastic and yield. Figure 2 is a graph of temperature versus N. S. T. Figure 3 is a graph of temperature versus yield. These graphs clearly illustrate that peroxide concentration is of major importance in determining N. S. T., whereas temperature is of considerably less importance, except as to yield.

Time of polymerization or residence time affects both yield and N. S. T. value of the plastic. However, after a minimum time for a given temperature, the effect of time is less pronounced and does not become a major factor. For example, at a temperature of about 0° C. or 15° C., a minimum reaction time of about 24 hours is required.

Figure 4:
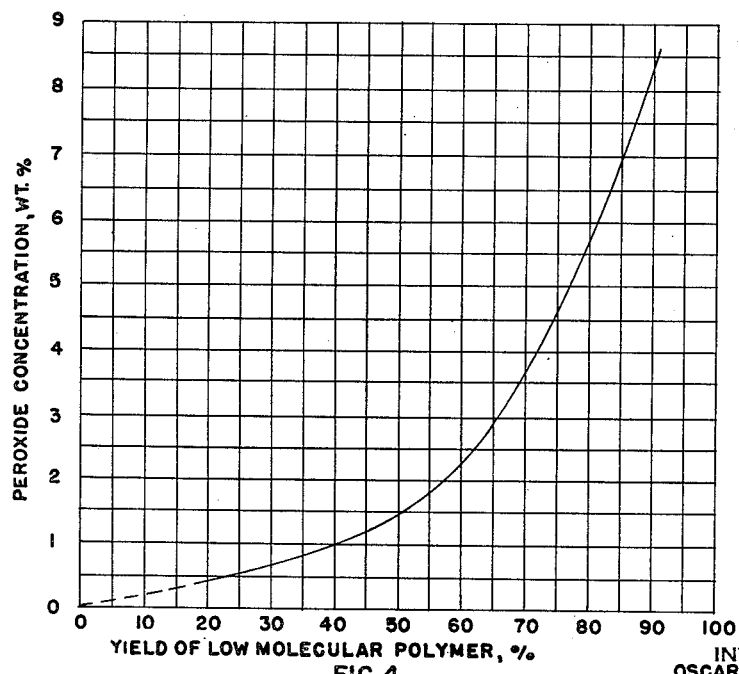

In the polymerization of trifluorochloroethylene to produce oils, greases, and waxes having softening points extending up to about 200° C., both the concentration of promoter and monomer in the chain transfer solvent, which is necessary for the production of these lower molecular weight materials, are major factors in determining the molecular weight and characteristics of these products. For a selected concentration of promoter and monomer in the chain transfer solvent employing appropriate conditions of temperature and residence time, a definite product of a relatively narrow range of molecular weight is produced, e. g. oil, grease, or wax. For example, the polymerization of trifluorochloroethylene at a temperature of about 100° C. and autogenous or superatmospheric pressure with varying concentrations of benzoyl peroxide as a promoter for substantially constant monomer concentration in chloroform as the chain transfer solvent, produces oils of different boiling ranges and in different yields, as shown in the accompanying Figure 4 of the drawings. Figure 4 is a plot of promoter concentration in chain transfer solvent versus yields of low molecular weight polymer, which yields indicate high yields of oil.

As in the production of plastics, the initial concentration of promoter is selected according to Figure 4 of the drawings to correspond to the yield of low molecular weight product. In addition, the concentration of monomer is also controlled; the lower the concentration of monomer, the lower the molecular weight of the product. The promoter and monomer concentration in chain transfer solvent is not permitted to vary more than 10 per cent from the selected initial concentrations at any time during the polymerization. The concentration of the promoter and monomer may unavoidably vary at times more than the above limits, but such control should be maintained so that variations of more than 10 per cent account for less than 10 per cent of the reaction time, which reaction time is usually a matter of minutes, depending upon such factors as temperature and promoter employed. With a reaction time of 60 minutes the variation in concentrations beyond the critical limits should under no circumstances be for more than about 6 minutes of the polymerization residence time. Temperature does not, in general, determine the molecular weight of the product, but primarily affects the reaction time required and yield. Within the general temperature range, the reaction temperature in oil production has a less effect than in plastic production.

Residence time is defined as the length of time any particular polymerized monomer is retained in the polymerization zone.

The use of inert diluents, such as water or hydrocarbon oils, in the polymerization reaction mixture as a means for removing heat and otherwise assuring a smoother reaction, is within the scope of this invention. In discussing concentrations of promoter and monomer, the presence of the diluent is not considered in reporting percentages, but only the presence of the active ingredients, such as monomer, promoter, and chain transfer solvent.

Control of the concentrations may be accomplished by continuous or intermittent addition of the active components of the polymerization as they are consumed or converted in an amount sufficient to maintain their concentration substantially constant or within the critical range. In plastic production, promoter is consumed more rapidly than monomer; therefore, promoter is added at a more rapid rate than the monomer in continuous operation. In oil production, the monomer and promoter are consumed more rapidly than the chain transfer solvent and, therefore, both monomer and promoter are added more rapidly than the chain transfer solvent during a continuous polymerization process to maintain their concentration at the desired value.

For a better understanding of the present invention, reference will be made to Figure 5 of the accompanying drawings which diagrammatically illustrates an arrangement of apparatus in elevation which may be used for the production of plastic polymers of trifluorochloroethylene in accordance with the teachings of this invention. The principal pieces of apparatus for effecting the process depicted in Figure 5 of the drawings comprises a dehalogenator 6, a polymerization reactor 44, separators 67 and 68 and various purification and separation equipment for purifying and separating materials utilized and produced by the process.

Figure 5:
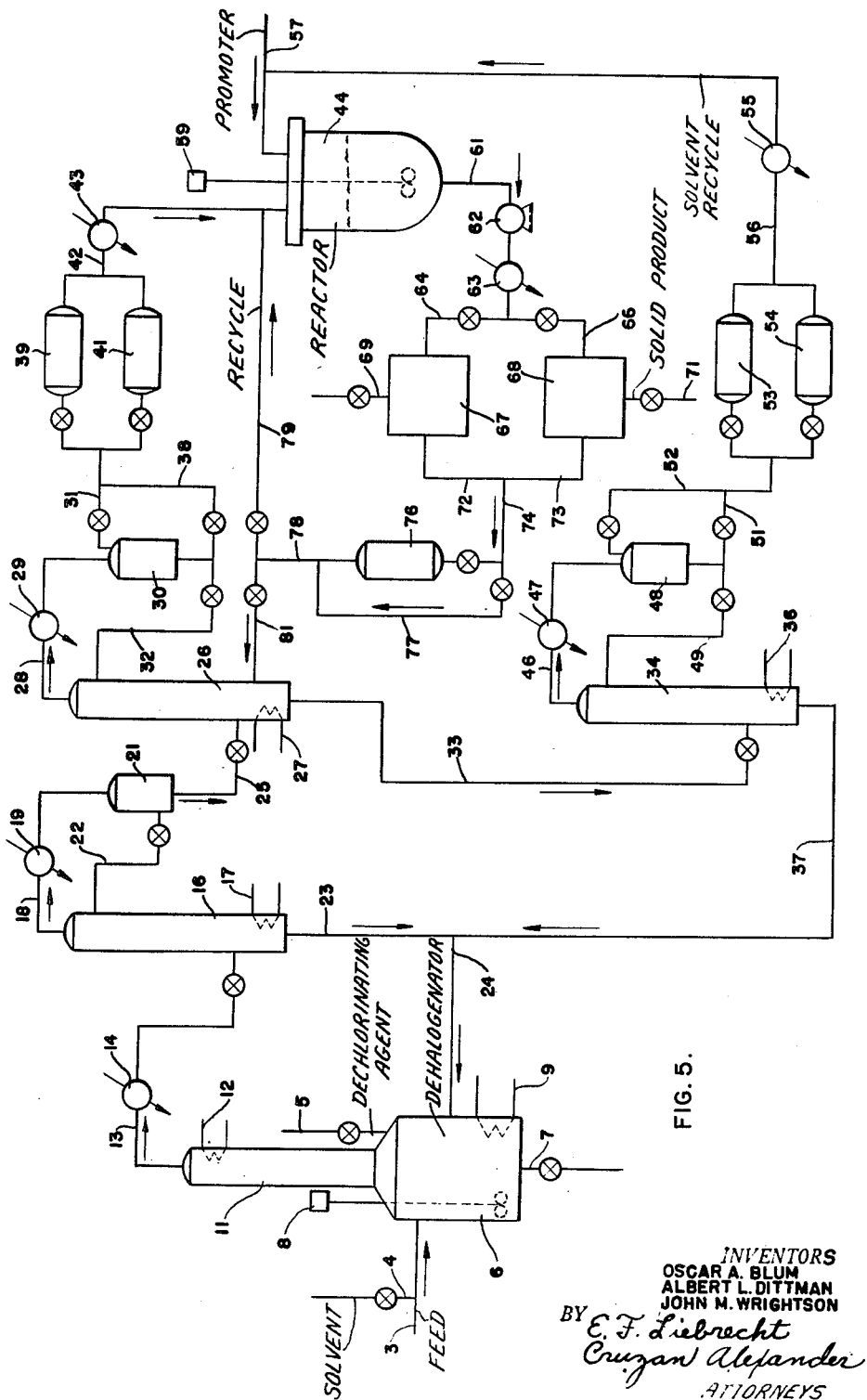

According to Figure 5 of the drawings and the process illustrated, trichlorotrifluoroethane of the 1,2,2-chloro-structure, which may be obtained commercially on the open market as Freon 113, is continuously passed through conduit 3 to dehalogenator 6. A metallic dechlorinating agent, such as zinc dust, is continuously or intermittently introduced through conduit 5 into reactor 6. Although zinc is preferred, various metal dechlorinating agents may be used, such as tin, magnesium, and iron, without departing from the scope of this invention. A suitable solvent or diluent is continuously or intermittently introduced into feed conduit 3 through conduit 4, or alternatively directly into dehalogenator 6 by means not shown. In the discussion of the process of the drawing, the solvent used in the dechlorination of trichlorotrifluoroethane is methyl alcohol. The amount of metal dechlorinating agent introduced into dehalogenator 6 is equivalent to at least the theoretical amount necessary for removal of two halogen atoms from the halocarbon. Preferably, an excess dechlorinating agent is used in effecting the dechlorination reaction and the excess may be as much as 100 per cent or more. The amount of solvent may vary depending upon the reaction conditions, the quantity generally being less for superatmospheric than for atmospheric pressures, a suitable quantity for operation at atmospheric pressure being 65 per cent of the weight of the perhalocarbon charged. The mixture of perhalocarbon and solvent is vigorously agitated by conventional means, such as mechanical stirrer 8, to suspend the metal dechlorination agent in the liquid mixture in the lower portion of reactor 6. Required temperatures are maintained in the liquid phase of dehalogenator 6 by conventional means, such as heating or cooling coils 9 or a jacket through which a heat exchange medium is passed at the desired temperature. For a temperature below about 0° C., a light naphtha may conveniently be used. Water may be used for higher temperatures. Outlet conduit 7 is used for discharging the liquid contents of dehalogenator 6.

For the dechlorination of trichlorotrifluoroethane to trifluorochloroethylene, pressures between atmospheric and about 300 or 400 pounds per square inch gage are employed, preferably a pressure between about 20 and about 200 pounds per square inch gage, and a particularly suitable pressure is about 180 pounds per square inch gage. In the preferred form of the invention, the pressure should be such at any given temperature to permit vaporization of the trifluorochloroethylene from the liquid phase in dehalogenator 6 without substantial vaporization of the other constituents of the reaction mixture. A suitable temperature for the dehalogenation is between about 0° C. and 200° C. It is preferred to use a temperature between about 40 and about 150° C., usually about 115° C. for operation at 180 pounds per square inch gage. At the higher temperatures the rate of reaction is increased, which in most instances is desirable. However, excessive temperatures cause undesirable side reactions.

In starting up the dehalogenation reaction a small proportion of a metal halide, such as zinc chloride, is introduced into dehalogenator 6 to promote or start the dehalogenation reaction. The metal halide may be introduced separately, or in admixture with the dehalogenating agent through conduit 5.

Suitable solvents or diluents for the dehalogenation step comprise methyl, ethyl, n-propyl, and n-butyl alcohols; dioxane, glycerol, butyl Carbitol, the Cellosolves and water. Other known solvents or diluents may be used, if desired, without departing from the scope of this invention.

Since the temperature and pressure conditions which are maintained in dehalogenator 6 according to the preferred embodiment of this invention are such that the perhalo-olefin formed therein as the desired product is vaporized, the olefin passes upward together with entrained and vaporized saturated perhalocarbons and solvent through a rectification column 11. The major proportion of the perhalocarbon and solvent are retained in the liquid phase in dehalogenator 6. The upper portion of the rectification column 11 is maintained at a temperature substantially lower than the temperature of the liquid phase of dehalogenator 6, preferably at least 20° C. lower. The top temperature of column 11 is maintained at the desired level by indirect heat exchange means 12 or by refluxing a portion of liquefied overhead product. In rectification column 11, methyl alcohol solvent and trichlorotrifluoroethane are condensed and flow downward back into dehalogenator 6, while the monomer is removed therefrom through conduit 13. Since rectification column 11 effects only a partial separation, the vaporous stream in conduit 13 will contain minor amounts of unremoved trichlorotrifluoroethane and methyl alcohol.

The monomer-containing stream is passed through conduit 13 to a cooler 14, wherein it is liquefied, and thence to a fractional distillation column 16. As previously mentioned, a portion of the liquefied effluent in conduit 13 may be returned by means not shown to the upper portion of rectification column 11 as liquid reflux therefor to aid in maintenance of the required top temperature.

The subsequent treatment of the effluent in conduit 13 is an important feature of the process since the purification of the monomer trifluorochloroethylene by the removal of the alcohol solvent and saturated perhalocarbon is essential in order to obtain satisfactory yields and reproducible results in the polymerization effected in reactor 44. To effect the purification of the monomer, liquid from conduit 13 is introduced into fractional distillation column 16. This column is maintained at a temperature and pressure corresponding to that required to pass monomer overhead and to recover the solvent and unreacted saturated perhalocarbon as a bottoms product. If superatmospheric pressures are employed during the dehalogenation in unit 6, the pressure of the liquid in conduit 13 may be decreased upon introduction into distillation column 16 to aid in the fractional distillation and lower the temperatures required therein. Both atmospheric and superatmospheric distillations are feasible and in some cases superatmospheric distillation may be preferred. A top temperature of about −20° C. is appropriate for atmospheric distillation in column 16. Indirect heat exchange element 17 is provided in the lower portion of column 16 as a means for controlling the temperature of the bottoms product, the temperature of which is about 15° C. at atmospheric pressure. Element 17 may comprise an internal coil within column 16 or a conventional external reboiler. Upon distillation, the monomer is removed from column 16 through conduit 18 together with a relatively minor proportion of unremoved saturated halocarbon and also in some cases small amounts of methyl alcohol. The vaporous effluent is passed through conduit 18 to a conventional cooler or condenser 19 wherein the effluent is condensed. From cooler 19, the effluent is passed to an accumulator 21 in which condensate is collected. A portion of the condensate is returned to column 16 through conduit 22 as liquid reflux therefor. Internal cooling means (not shown) may be positioned within the upper portion of column 16 to aid in refluxing of the distillation column and may be used in addition to, or alternatively to, condensate returned through conduit 22.

The bottoms product from distillation column 16 is removed therefrom through outlet conduit 23 and is returned by means of a pump (not shown) through conduits 23 and 24 to dehalogenator 6. The bottoms product comprises the major proportion of the solvent and saturated perhalocarbon in the monomer-containing stream of conduit 13.

Analysis of a typical overhead product of column 16 when it is operated at a top temperature of about −20° C. and a kettle temperature of about 15° C. at atmospheric pressure indicates the presence of less than about one per cent of impurities, such as methyl alcohol and trifluorotrichloroethane.

A portion of the stream in conduit 23 may be discarded by means not shown in order to prevent the build-up of contaminants in the system, such as by-products and polymers formed during the dehalogenation. Liquid can also be withdrawn directly from dehalogenator 6 through outlet conduit 7 for the above purpose.

In some instances it may be desirable to use a soluble stabilizer or inhibitor to prevent oxidation and/or polymerization of the monomer during distillation and storage. Such soluble inhibitors comprise a tertiary amine or terpene.

Condensate from accumulator 21 is passed through conduit 25 to a second fractional distillation column 26 in which solvent and unreacted perhalocarbon are removed from the monomer. In column 26 the control of temperature and pressure conditions is more selective than in column 16 in order to make a closer cut between the monomer and the undesired components, such as the solvent and saturated perhalocarbon. The temperature and pressure are selected such that the monomer is removed overhead through conduit 28 and is passed through a cooler 29 to an accumulator 30. Condensate at a temperature of about −28° C. is returned to the top of column 26 through conduit 32 as reflux. Solvent and saturated perhalocarbon are removed as a bottoms product through an outlet conduit 33. When operating at approximately atmospheric pressure the top temperature of column 26 is about −26° C. and the kettle temperature of column 26 is about −20° C. Element 27 comprises a conventional heat exchange means, such as an internal coil or an external reboiler, for maintaining the desired temperature at the bottom of column 26. A refrigerant, such as a light naphtha, is circulated through coils 27 at about −15° C. Solvent and unreacted monomer from reactor 44 which have been separated from the solid polymer product in separators 57 and 58 are introduced into the lower portion of column 26 through conduit 81. The solvent used in the polymerization for dissolving the polymerization promoter and its recovery will be discussed more fully hereinafter. Since the polymerization solvent is also higher boiling than the monomer, it is removed with the bottoms product through outlet conduit 33.

For operating distillation column 26 at a top temperature of −26° C. and at a kettle temperature of about −20° C. at atmospheric pressure and for low temperature polymerization to produce a solid polymer, analysis of a typical monomer overhead fraction indicates the presence of less than 0.005 volume per cent of impurities, such as methyl alcohol. The bottoms product from column 26 comprises as its major component trichlorofluoromethane, the solvent used in the polymerization step.

The liquid bottoms product from distillation column 26 continuously passes through conduit 33 to a third fractional distillation column 34 in which the solvent used in the polymerization step, such as $CCl_3F$, is separated from saturated perhalocarbon ($C_2F_3Cl_3$) and solvent (methyl alcohol) used in the dehalogenation reaction. Temperature and pressure conditions of distillation column 34 are such that trichlorofluoromethane is passed overhead while trichlorotrifluoroethane and any remaining methyl alcohol are removed as a bottoms product. When using atmospheric pressure in distillation column 34, the kettle temperature will be about 48° C. and the overhead temperature will be about 27° C. for separating trichlorofluoromethane from trichlorotrifluoroethane. For super-atmospheric pressures higher temperatures are used. The trichlorotrifluoroethane-containing bottoms product is removed from column 34 through outlet conduit 37 and is continuously returned by means of a pump (not shown) through conduit 24 to dehalogenator 6. Element 36 is a conventional heat exchange means, such as an internal coil or external reboiler, for controlling the kettle temperature of distillation column 34. The overhead product comprising trichlorofluoromethane and less than about one per cent of the other components of the feed is removed from column 34 through conduit 46, a portion of which overhead may be condensed in a conventional cooler 47 and returned through conduit 49 to the upper portion of column 34 as reflux therefor. The treatment of the overhead product of column 34 and its return to reactor 44 will be discussed more fully subsequently.

The overhead product from the second distillation column 26 in conduit 28 comprises monomer and traces of contaminants, such as methyl alcohol or other oxygen-containing compounds, such as water. This vaporous stream in conduit 28 is passed through a conventional cooler 29 in which the vapors are cooled and condensed and resulting condensate is passed from cooler 29 to an accumulator 30. Condensate which is collected in accumulator 30 is returned through conduit 32 to the upper portion of distillation column 26 as liquid reflux for controlling the top temperature thereof. Alternatively or in addition to refluxing with condensate from conduit 32, internal cooling means (not shown) may be positioned within the upper portion of column 26 for causing internal refluxing.

If only that much of the vapors in conduit 28 are condensed as to provide reflux to column 26, the remaining vapors are removed from accumulator 30 through conduit 31 and are passed through treaters 39 and 41, which are used alternately, to remove oxygen-containing compounds. While one treater is being used, the other treater is being filled with fresh treating agent or sorbent material or the sorbent material therein in being regenerated. Treaters 39 and 41 contain suitable material for removing traces of methyl alcohol and other oxygen-containing compounds present in the gaseous stream. Suitable treating agents or sorbents comprise phosphorous pentoxide, silica gel, activated carbon, and mixtures thereof; however, various other sorbents may be used which are known to those skilled in the art. Treaters 39 and 41 are used since a monomer of high purity is required in the polymerization of trifluorochloroethylene at a low temperature to produce a normally solid polymer of good physical and chemical properties. Preferably, treaters 39 and 40 contain alternate layers of phosphorous pentoxide and silica gel.

After passage of the monomer stream through treaters 39 or 41, the stream is passed through conduit 42 to cooler 43 wherein the gaseous stream is cooled and condensed. From condenser or cooler 43, condensate at the desired temperature is passed to reactor 44. It is advantageous although not necessary to provide a cooled holding tank (not shown) to aid in the regulation of the flow of monomer to reactor 44.

To treat the monomer stream in the liquid condition in treaters 39 and 41, cooler 29 is operated such that substantially the entire effluent stream in conduit 28 is condensed. Condensate from accumulator 30 is then passed through conduit 38 to treaters 39 and 41, which are operated as described with respect to vapor phase operations. In this modification, cooler 43 may be omitted; however, cooler 43 may be used to further cool the condensate to the desired polymerization temperature after passage through treaters 39 and 41 without departing from the scope of this invention.

Various methods and procedural steps for recovery and purification of the monomer may be practiced, although each method or procedure is not necessarily equivalent to the others. The steps for recovery and purification of the monomer depicted in the drawing is only one of several which may be followed to obtain a monomer of sufficient purity for producing a plastic of good physical and chemical characteristics. For example, the monomer-containing stream in conduit 13 may be treated with $P_2O_5$ prior to fractional distillation thereof and subsequent to distillation the monomer concentrate stream is treated with silica gel. The successive steps of treating the monomer stream with $P_2O_5$, distillation, and treating with silica gel renders a monomer of high purity. Another procedure consists of the steps of treating the monomer-containing stream of conduit 13 with $P_2O_5$ and then with silica gel. This latter procedure has been found satisfactory for purifying the monomer for subsequent polymerization to solid polymers without distillation. According to the procedure described with reference to the drawing, one of the distillation columns 16 or 26 may be eliminated without departing from the scope of this invention. Still another method of purifying the monomer constitutes water washing. Water washing may be effected prior to either of the distillation steps illustrated by units 16 and 26. Alternatively, either or both of the distillation steps may be omitted and replaced with water washing. Treaters 39 and 41 then remove the traces of water in the monomer stream. The choice of the recovery and purification procedure used will depend upon the economic evaluation as well as such factors as the purity of the monomer desired.

In reactor 44, liquid trifluorochloroethylene is polymerized in the presence of an organic peroxide promoter to produce a plastic polymeric material having good chemical and physical characteristics. A particularly suitable promoter for the production of a plastic product is bis-trichloroacetyl peroxide. The amount of trichloroacetyl peroxide used varies between about 0.01 and about 0.50 per cent of the monomer in the reaction mixture, depending on the character of the ultimate product to be produced.

Bis-trichloroacetyl peroxide may be prepared by reacting sodium peroxide with trichloroacetyl chloride at a temperature of about $-15°$ C. The bis-trichloroacetyl peroxide product is extracted from the resulting mixture with trichlorofluoromethane. Bis-trichloroacetyl peroxide is then recovered from the trichlorofluoromethane by crystallization.

Various other organic peroxides, such as trifluoroacetyl peroxide, difluorochloroacetyl peroxide, 2,4 dichlorobenzoyl peroxide, chloracetyl peroxide, bis-trifluorodichloropropionyl peroxide, and dichlorofluoroacetyl peroxide have been found capable of promoting the desired polymerization reaction to produce a normally solid polymer of trifluorochloroethylene.

Since the peroxide promoter is solid under normal conditions and substantially insoluble in the monomer, a solvent is used to dissolve the promoter and the resulting solution of the promoter is injected into reactor 44 through conduit 57. The use of the promoter as a solution facilitates handling and intimate mixing of the promoter with the monomer in the reaction zone. The preferred solvent is one which is non-reactive and has a boiling point higher than the boiling point of the monomer. The quantity of solvent containing the promoter employed is usually between about 1 and about 20 per cent of the monomer feed but larger or smaller amounts may be used without departing from the scope of this invention. The preferred solvent of the present invention is trichlorofluoromethane. The solution of promoter is maintained at a sufficiently low temperature prior to introduction into the reactor to minimize decomposition.

After being admixed with fresh or recycle solvent from conduit 56, a solution of promoter is continuously or intermittently introduced into reactor 44 through conduit 57 in an amount to maintain the concentration of promoter within 10 per cent of the initial selected concentration at all times. Alternatively, the solution of promoter may be injected into conduit 42 for admixture with the monomer by means not shown. As previously stated, the concentration of promoter is initially selected in accordance with the requirements for producing a plastic of the desired characteristics such as N. S. T. value. For the production of a plastic polymer a temperature between about $-20°$ C. and about $150°$ C. is employed depending upon the promoter and other operating conditions used. Generally, however, somewhat higher temperatures can be used in the process of this invention than are possible for the batch-wise processes described previously. With a bis-trichloroacetyl peroxide promoter a temperature between about $-20$ and about $25°$ C. is preferred. The pressure should be at least in excess of the vapor pressure of the monomer at the polymerization temperature employed. The solid polymer of polytrifluorochloroethylene is formed as fine particles suspended in the liquid monomer because of its insolubility therein. The required residence time corresponding to the temperature selected is observed.

Reactor 44 comprises a steel vessel and may be provided with cooling coils or a cooling jacket (not shown) for aiding in the maintenance of the desired temperature therein. The form of the reaction vessel is immaterial from the standpoint of this invention and the vessel may be in the form of elongated tubes or coils through which the reaction mixture flows as a turbulent mixture. As shown in the drawing, however, the reaction vessel is an enlarged zone in which is contained a substantial quantity of liquid monomer containing suspended solid polymer. In the enlarged vessel shown, the solid polymer is maintained in suspension by means of a conventional mechanical stirrer 59. Stirrer 59 also aids in maintaining uniform temperature throughout the liquid phase in the reaction vessel 44. The stirrer 59 may be omitted if the liquid circulation within the vessel is sufficiently great to maintain the polymer suspended in the liquid monomer, such as the circulation caused by withdrawal and introduction of liquid. In using a reaction coil or tube of restricted cross section, the flow through the reaction tube causes sufficient turbulence or agitation to maintain the the solid particles of monomer suspended in the reaction mixture.

In accordance with this invention, a slurry of monomer and solid polymer is removed at the appropriate rate to give the proper residence time from reactor 44 and passed through conduit 61 by means of pump 62 to cooler 63. The slurry is cooled in cooler 63 to a temperature at least 5° C. below the temperature of reactor 44 so that when the unreacted monomer is recycled, the temperature of the reaction vessel is maintained substantially constant at the desired value by controlling the amount of heat removed in cooler 63. From cooler 63 the cooled slurry is passed through either one of separating zones 67 and 68 through conduits 64 and 66, respectively. Separation units 67 and 68 are used alternately. While one separating zone is on process flow the solid polymer is being removed from the other separating zone. Any of the conventional filter means may be used for separating the solid polymers from the unreacted monomer. Such filter means may comprise a conventional plate and frame filter press, a leaf filter, a rotary continuous filter, such as those disclosed in "Elements of Chemical Engineering," Badger and McCabe, McGraw-Hill Book Company (1936), second edition. When a continuous filter is used, dual filters are unnecessary. On the other hand, separators 67 and 68 may comprise a settling zone in which the solid polymer is settled from the monomer and accumulates in the bottom of the settling vessel from where it is removed through a suitable star valve or the like. In the diagrammatic illustration shown in the drawing, the solid polymer is removed from separators 67 and 68 through outlet conduits 69 and 71, respectively.

Unreacted monomer is passed from separators 67 and 68 through conduits 72 and 73, respectively, and is recycled to reactor 44 through conduits 74, 78 and 79. A portion of the recycled monomer is returned to distillation column 26 through conduit 81 in order to repurify the monomer. Usually the ratio of the amount of monomer recycled to that diverted to distillation column 26 is about 1:1 to about 10:1 by volume or higher, preferably a ratio of about 3:1 to about 4:1.

Since acidic impurities, such as trichloroacetic acid, phosgene and their derivatives, contaminate the monomer-containing stream, it is desirable to remove these contaminants in order to prevent their build-up in the system and to prevent their adverse effect on the physical and chemical qualities of the solid polymer product. Such acidic impurities are removed from the recycle monomer stream by passing the stream through a treater 76 containing a suitable acid absorption medium, such as sodium or potassium hydroxide. A portion of the stream may by-pass treater 76 by means of conduit 77, if desired. If the monomer stream is treated in treater 76 with an aqueous alkali solution, driers (not shown) must be provided for removing traces of aqueous solution from the treated stream.

The monomer-containing stream in conduit 81 contains the solvent used for dissolving the promoter and in the particular embodiment of the invention described the solvent is trichlorofluoromethane. When the monomer-containing stream in conduit 81 is introduced into distillation column 26, the monomer is removed overhead as previously described and the solvent is removed with the bottoms product through outlet conduit 33. This bottoms product from distillation column 26 is passed to a third distillation column 34 as previously discussed. In distillation column 34, trichlorofluoromethane is continuously recovered as an overhead product and is passed through conduit 26 to a conventional cooler 47 in which at least a portion of the vaporous overhead product is condensed. Condensate is then passed to accumulator 48. From accumulator 48 condensate is recycled to the upper portion of column 34 through conduit 49 as liquid reflux therefor. When the entire overhead product is condensed in cooler 47 condensate is passed from accumulator 48 through conduit 51 to treaters 53 and 54 to remove oxygen-containing compounds. When only the amount of overhead required for reflux in column 34 is condensed, the uncondensed overhead product is passed through conduit 52 through treaters 53 and 54. Treaters 53 and 54 are operated similarly and contain similar treating materials as were used in treaters 39 and 41 for removal of traces of methyl alcohol solvent which inhibits the polymerization reaction. As in the case of treaters 39 and 41, treaters 53 and 44 are used alternately, while one is being regenerated or refilled the other is on process flow.

Substantially pure trichlorofluoromethane is returned to conduit 57 for admixture with promoter and for the subsequent introduction into reactor 44 through conduit 57.

Continuous removal of a slurry from reactor 44 and recovery of solid polymer from the slurry is the preferred method of operation in polymerizing trifluorochloroethylene, but other methods may be used without departing from the scope of this invention. For example, a raking or elevating mechanism could be provided in the reaction vessel operating on a sloping bottom to remove the polymer particles as they settle to the bottom. Another modification is a rotating drum containing liquid monomer with a scraping means for removing the deposited polymer from the sides of the rotating drum.

The solid polymeric product recovered at 69 and 71 may be subjected to further treatment such as fluorination, pyrolysis, drying, etc., without departing from the scope of this invention. Various modifications and alterations of equipment of Figure 5 of the drawings, such as elimination of one of the distillation steps, changes in the sequence of purification steps, and changes in the shape and/or size of reactor 44, may be practiced without departing from the scope of this invention. Certain pieces of apparatus and auxiliary equipment, such as liquid level controls, flow controls, temperature and pressure controls, valves, pumps, coolers or condensers and storage facilities have been omitted from Figure 5 of the drawing as a matter of convenience and clarity.

Figure 6:
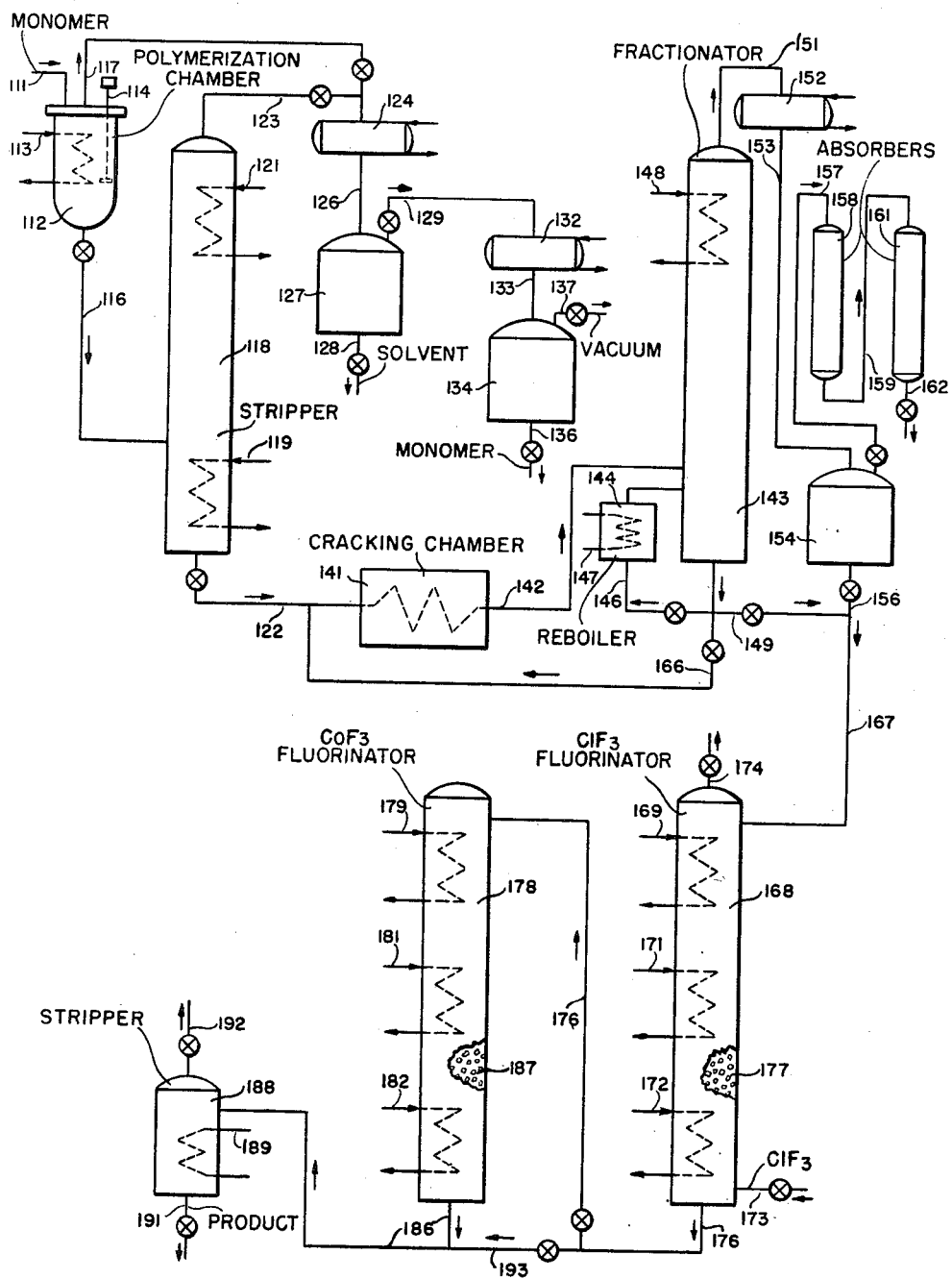

Reference will also be made to Figure 6 of the accompanying drawings which diagrammatically illustrates in elevation an arrangement of apparatus partly in cross section for the production of intermediate boiling perhalocarbon oils from the monomer, trifluorochloroethylene, employing the teachings of this invention. However, it is to be understood that the integrated process as illustrated in the drawing may be applied in general to the production of intermediate boiling perhalocarbon oils from other perhalo-olefins, as previously mentioned. The principal pieces of apparatus of the process illustrated in Figure 6 comprise a polymerization chamber 112, a cracking chamber 141, fluorinators 168 and 178 and various purification and separation equipment for purifying and separating materials utilized and produced.

The monomer, trifluorochloroethylene, is prepared and purified in a manner similar to that discussed with regard to the production of the solid polymer of Figure 5 of the drawings.

According to Figure 6 of the drawings and the process illustrated, the monomer, trifluorochloroethylene, the promoter, benzoyl peroxide, and the chain transfer solvent, chloroform, are introduced through conduit 111 into polymerization chamber 112. These materials may be introduced continuously or intermittently into chamber 112. Element 113 represents a conventional heating or cooling means for maintaining polymerization chamber 112 at the desired temperature level. Numeral 114 designates a conventional stirrer for maintaining the contents of chamber 112 in an agitated condition during polymerization.

As previously discussed, the quantity and rate of introduction of the active ingredients is controlled to maintain the concentration of promoter and monomer substantially constant at all times during the reaction and at that concentration selected to produce the product of the desired characteristics. In the polymerization unit shown in Figure 6, both promoter and monomer are best continually bled into the reactor after the initial batch. Since the consumption of chain transfer solvent is less than either the monomer or promoter, make up solvent may be added, if necessary, at relatively infrequent intervals.

Polymerization is effected under liquid phase conditions by employing a sufficiently high pressure at the temperature of polymerization. The temperature of polymerization will depend upon such factors as the particular promoter and chain transfer solvent employed. For the polymerization of trifluorochloroethylene, a suitable polymerization temperature will lie within the range of about 0° C. to about 300° C., preferably between about 70° C. and about 200° C. A suitable residence time is allowed for completing the desired reaction and obtaining the desired product and yield. The residence time will range from a matter of seconds to as much as one hundred hours, preferably between about 1 minute and about 10 hours. Excess pressures over that necessary to obtain liquid phase operations may also be used, such pressures ranging as high as 15,000 to 30,000 pounds per square inch gage.

Other organic promoters than benzoyl peroxide may be employed without departing from the scope of this invention. Examples of other suitable organic promoters include the acyl peroxides such as acetyl peroxide, monochloro, dichloro and trichloroacetyl peroxides, fluoroacetyl peroxides, chloroacetyl peroxides, p-bromobenzoyl peroxide, bis-trifluorodichloropropionyl peroxide, bis-difluorochloroacetyl peroxide, chlorodifluoroacetyl peroxide, dichlorofluoroacetyl, and the alkyl peroxides, such as diethyl peroxide, di-t-butyl peroxide, t-butyl hydroperoxide, cumene hydroperoxide, etc.

Suitable chain transfer solvents other than chloroform include carbon tetrachloride, bromotrichloromethane, trichlorotrifluoroethane, 1,2,2-tetrachloroethane, ethylene and saturated halogenated aliphatic compounds in general, preferably containing bromine or chlorine.

Inorganic polymerization promoters may, also, be employed. These inorganic promoters are usually used when the polymerization is effected in a liquid diluent, such as water, by the suspension or dispersion technique in which the monomer is dispersed in the liquid diluent. The preferred inorganic polymerization promoters are the persulfates, perborates, peroxides and perphosphates. Best results have been obtained with aqueous suspensions employing ammonium or potassium persulfate as the polymerization promoter.

The weight ratio of promoter to monomer charged is between about 1:10 to about 1:200, generally, in the range between about 1:15 to about 1:50. As a general observation, increases in the amount of the promoter decreases the molecular weight of the resulting product. When a chain transfer solvent is employed, such as with the organic promoters, the weight ratio of chain transfer solvent to monomer charged is between about 10:1 and about 1:5, and, as in the case of the polymerization promoters, increased amounts of chain transfer solvent result in a lower molecular weight product of the polymerization.

The oil product produced by the above illustrated polymerization has a boiling range between about 50 and about 350° C. at 1–2 mm. of mercury pressure, but the exact boiling range will depend upon the various operating conditions and promoter and solvent employed. A portion of the oil product will usually consist of both waxes and greases; that portion may be between about 10 and about 50 per cent by volume of the total product and depends upon the degree of control of concentrations maintained. Conversion as high as 90 per cent of monomer charged, or better, is possible under optimum conditions of operation.

Polymerization products are withdrawn from chamber 112, continuously or intermittently, through conduit 116 and passed to a stripper 118. In intermittent operations, normally gaseous components of reaction chamber 112 are withdrawn therefrom through conduit 117. In stripper 118 unreacted monomer, chloroform, promoter residue, and relatively low boiling perhalocarbons including about 10 weight per cent or less of the oil product are stripped from the polymerization products. Controlling the stripping or distillation such that about 5 to 10 weight per cent of the oil product is taken overhead assures complete removal of promoter and solvent from the oil product. Numeral 119 designates a conventional heating or cooling means for obtaining the desired bottoms temperature in stripper 118. For atmospheric pressure operations, the bottoms temperature of stripper 118 when polymerizing trifluorochloroethylene is usually maintained above room temperature, usually about 90 to 110° C. Numeral 121 designates a conventional cooling or heating means for maintaining the temperature of the top of stripper 118 at the desired value. If desired, heat exchanger means 121 may be omitted. The top temperature of stripper 118 maintained usually at a temperature lower than the bottom temperature and preferably, when polymerizing trifluorochloroethylene, at a temperature about 65° C. or above at atmospheric pressure, depending upon the desired materials to be passed overhead from stripper 118. Stripper 118 may include suitable packing or baffle plates therein to obtain efficient operation. In general, higher stripping temperatures are employed with superatmospheric pressure operations.

The overhead product comprising unreacted monomer and the solvent chloroform is withdrawn from stripper 118 through conduit 123 and combined with any gaseous materials in conduit 117 and passed to condenser 124 which is maintained at a sufficiently low temperature to condense substantially all of the chain transfer solvent. In the case of chloroform as the chain transfer solvent, condenser 124 is maintained at a temperature of about 60° C. or lower. Condensate and uncondensed vapors are passed from condenser 124 to accumulator 127 through conduit 126.

Condensate comprising the chain transfer solvent is removed from accumulator 127 through conduit 128 and is recycled by means not shown to polymerization chamber 112. Uncondensed vapors comprising the monomer trifluorochloroethylene are removed from condenser 127 and passed through conduit 129 to condenser 132 where the vapors are cooled to a temperature sufficiently low to condense the monomer at the prevailing pressure. Condensed monomer and any uncondensed vapors are passed from condenser 132 through conduit 133 to an accumulator 134. Condensate is removed from accumulator 134 by means of conduit 136 and is recycled by means not shown to polymerization chamber 112. Uncondensed vapors are removed from accumulator 134 through conduit 137 by means of a partial vacuum.

The crude perhalocarbon oils separated in stripper 18 substantially free from chain transfer solvent and promoter residue are removed from the bottom thereof by means of conduit 122 and are passed to a cracking chamber 141 where the oils are cracked to a product of lower boiling point and lower molecular weight. The crude perhalocarbon oils are passed through stainless steel coils immersed in a lead bath maintained at a temperature between about 330 and about 400° C., preferably between about 350° C. and about 380° C., at which temperature the polytrifluorochloroethylene oils and waxes are cracked. Subatmospheric pressures between about 25 and 200 mm. of mercury are generally employed, but higher or lower pressures are also applicable. The cracking feed may be introduced in either the vapor or liquid phase depending on the composition and character thereof, as desired. Higher temperatures, such as 600° C., may be used for cracking without departing from the scope of this invention. At the preferred temperature range the residence time of the oil in the cracking coils of chamber 141 will generally be between about 10 seconds and about 2 hours, depending upon the degree of cracking desired, type of apparatus and manner of operation.

It may be preferred to effect the cracking or pyrolysis of the perhalocarbon oils in the presence of free chlorine or free fluorine or both. Cracking in the presence of chlorine or fluorine produces a somewhat more stable oil than can be obtained without the presence of a halogen and minimizes the amount of halogen required in the subsequent stabilization treatment. Usually the free halogen is introduced with the perhalocarbon to be cracked into the reaction or cracking zone and a metal halide, such as antimony pentachloride, is also introduced or is present in the reaction zone.

The vaporous cracking effluent is removed from cracking chamber 141 and is cooled and condensed by means not shown. The condensed cracked fraction is passed through conduit 142 to fractionator 147, into which it is introduced at an intermediate point. A reboiler 144 is employed to maintain the desired bottom temperature of fractionator 143. A portion of the liquid bottoms product is circulated through conduit 146 and reboiler 144 and returned to fractionator 143. Element 147 is a conventional heat exchanger for maintaining the desired temperature of the reboiler which is generally between about 200 and about 350° C. at a pressure about 1–2 mm. of mercury. The bottoms product comprising perhalocarbon oils boiling above about 250 to 350° C. is removed from fractionator 143 by means of outlet conduit 149. All or a portion of the bottoms product from fractionator 143 may be recycled to a cracking chamber 141 by means of conduit 166.

Numeral 148 designates a cooling coil in the upper portion of fractionator 143 for maintaining the top temperature of the fractionator at the desired level, preferably between about 100 and about 300° C. at the aforesaid pressure. An overhead vaporous fraction comprising relatively low boiling perhalocarbon oils and small quantities of monomer, hydrogen fluoride, hydrogen chloride, etc., is removed from fractionator 143 and passed through conduit 151 to condenser 152. Condenser 152 is maintained at a temperature below about 100° C. to condense substantially all of the perhalocarbon oils. Condensate is passed from condenser 152 through conduit 153 to accumulator 154. Condensate from accumulator 154 comprising relatively low boiling perhalocarbon oils is removed from accumulator 154 through conduit 156. A portion of this condensate may be recycled to the upper portion of fractionator 143, by means not shown, as a reflux, or may be recycled to cracking chamber 141, if desired, by means not shown. Uncondensed vapors comprising monomer, hydrogen fluoride and hydrogen chloride are removed from accumulator 154 through conduit 157 and passed to absorber 158, which contains sodium fluoride. In absorber 158 hydrogen fluoride is absorbed. The remainder of the gaseous material comprising monomer and hydrogen chloride is passed from absorber 158 through conduit 159 to absorber 161, which contains caustic such as solid sodium hydroxide. In absorber 161 hydrogen chloride is removed from the gases. The remaining gases comprising monomer and any accompanying gaseous perhalocarbons are removed from absorber 161 through conduit 162 by means of a partial vacuum, and may be recycled to reactor 114, if desired.

The fluorocarbon oil fractions in conduit 149 and/or 156 and/or any intermediate fractions withdrawn from fractionator 143 by means not shown are now subjected to a stabilization treatment comprising the successive steps of fluorination with chlorine trifluoride and cobalt fluoride to improve the physical and chemical characteristics of the oil. The various oil fractions recovered from fractionator 143 may be stabilized separately or may be combined for stabilization in any manner, as desired. According to the present description, the oil fractions from conduits 149 and 156 are combined for treatment and are passed through conduit 167 to a chlorine trifluoride fluorinator 168. Fluorinator 168 comprises an elongated vertical tower having a plurality of longitudinally spaced heat exchangers 169, 171 and 172. The perhalocarbon oil fraction to be fluorinated is introduced into the upper portion of column 168 and the liquid oils pass downwardly through column 168 countercurrently to upward flowing chlorine trifluoride gas introduced into the lower portion of the tower by means of conduit 173. The preferred composition of this gas is 90 volume per cent nitrogen and 10 volume per cent $ClF_3$. A temperature gradient is preferably maintained from top to bottom of column 168 by means of heat exchangers 169, 171 and 172. The overall temperature gradient of column 168 is usually between about 100 to 150° C. at the top to about 200 to 250 or 300° C. at the bottom. A uniform temperature may be imposed on tower 168, if desired, without departing from the scope of this invention. Unreacted chlorine trifluoride gas and substituted hydrogen and hydrogen fluoride are removed as vapors from the upper portion of column 68 through conduit 174. Fluorinated oils are removed as a liquid from the lower portion of column 168 through outlet conduit 176.

The fluorinated and partially stabilized oils are passed from tower 168 through conduit 176 to cobalt trifluoride fluorinator 178. Fluorinator 178 also comprises an elongated vertical tower having a plurality of spaced heat exchangers 179, 181 and 182 along the length of the tower. The partially stabilized perhalocarbon oils are introduced through conduit 176 into the upper portion of column 178 and flow downwardly over granular cobalt fluoride. As in column 168 for fluorination with cobalt trifluoride, a temperature gradient is preferably maintained in fluorinator 178 by means of heat exchangers 179, 181 and 182. Fluorination is usually carried out at a top temperature of about 80 to 100° C. and at a bottom temperature of about 200 to 250° C. Substantially completely stabilized oils are removed as liquids from the lower portion of column 178 through conduit 186. Other fluorinating agents may be employed without departing from the scope of this invention. Numeral 187 indicates a suitable packing material comprising the promoting agent or the fluorinating agent per se in column 178.

The vapors recovered from fluorination tower 168 through conduit 174 may be passed through suitable absorbers and caustic scrubbers to remove and recover the acidic compounds and chlorine and fluorine, if desired. It may be desirable to pass these vapors containing fluorine and chlorine to cracking chamber 141 by means not shown and cracking the perhalocarbon oils in the presence of such vapors as previously described.

Substantially completely stabilized oils from column 178 are passed through conduit 186 to a stripper 188. Numeral 189 designates a heat exchange means for maintaining the desired temperature of the oils in the lower portion of stripper 188. With polytrifluorochloroethylene oils, the stripping temperature at the bottom of stripper 88 is maintained between about 100 and 250° C. If desired, nitrogen or other inert gas may be bubbled through the liquid oils in stripper 88 to aid in stripping fluorine and chlorine and other impurities from the oil. The stripped vapors are removed from stripper 188 through conduit 192 and may be caustic washed or treated in any conventional manner to remove or render harmless obnoxious and dangerous impurities. The stripper oil is removed from stripper 188 through conduit 191 and may be subjected to further treatment, such as fractional distillation, to recover and separate desired fractions or compounds.

In some instances it may be unnecessary to subject the fluorinated fraction from tower 168 to further fluorination. If further fluorination is not necessary or not desired, the perhalocarbon oils in conduit 176 may by-pass fluorinator 178 by means of conduit 193 and may thus be passed directly to stripper 188.

Figure 7:
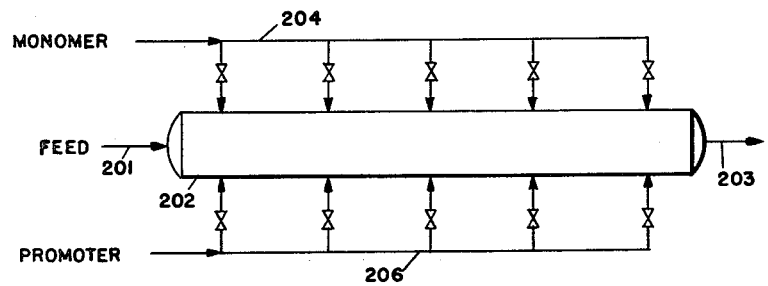
Figure 8:
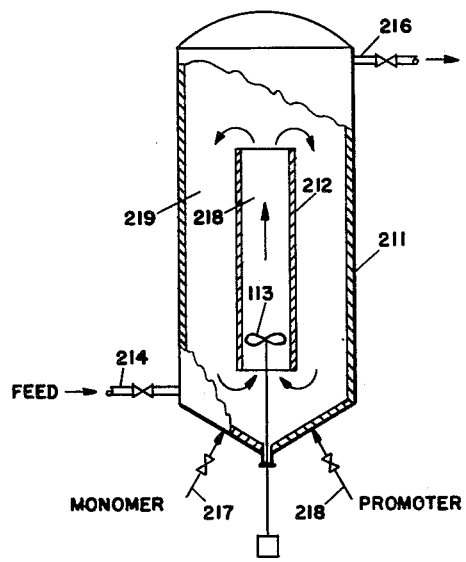

Figures 7 and 8 are diagrammatical illustrations of apparatus suitable for effecting the continuous polymerization of perhaloolefins to oils under controlled concentrations of promoter and monomers and may replace such equipment as reactor 112 of Figure 6. According to Figure 7, a feed comprising monomer, promoter and chain transfer solvent is introduced through conduit 201 into an elongated reaction chamber 202 having sufficient length in relation to the charging rate to provide the appropriate residence time to produce the desired product. The effluent of the reaction, including unreacted components, is removed from reaction chamber 202 through conduit 203. As the reactants pass through the reaction chamber the monomer and promoter components are consumed or converted at a faster rate than the solvent. As a result of this phenomenon, the concentration of the monomer and promoter decreases as the polymerization proceeds along the longitudinal length of the reaction chamber 202. As previously stated, it has been found that the concentration of monomer and promoter should be maintained within relatively narrow and selected limits. This is accomplished by introducing a feed of a predetermined composition into reactor 202 through conduit 201 and supplementing the monomer and promoter as they are consumed by the introduction of these components at longitudinal and spaced intervals along the reaction zone 202 through conduits 204 and 206, as shown. The spacing intervals are correlated with the rate of addition of the components such that the concentration of promoter and monomer is maintained within selected limits throughout the entire reaction zone. In other words, at the point of addition of the monomer and promoter the concentration of these components is not above the desired limit and at no place in the reaction zone are the monomer and promoter permitted to decrease below the minimum limit.

Figure 8 is another illustration of apparatus for effecting control of the promoter and monomer concentrations in the production of oil and also may replace reactor 112 of Figure 6. As in Figure 6, a feed of a predetermined composition is introduced through conduit 214 into reactor 211. Reactor 211 contains an inside chamber 212 forming an annular space between the outer shell of reactor 211 and inner shell 212. The reaction mixture circulates upwardly through the inner annular space within the shell 212 and downwardly through annular space 219, completing the cycle. Circulation is effected by conventional propeller or stirrer 213 preferably located at the bottom and within the inner shell 212. The bulk of the circulating material in reactor 211 is the solvent which constitutes at least 90 per cent of the reaction mixture. Into this circulating mass of solvent, monomer and promoter are injected through conduits 217 and 218, respectively, into the lower portion of reactor 211 at the mouth of inner shell 212. The addition of monomer and promoter through conduits 217 and 218 is so controlled that the concentration of these components is maintained within the preferred limits at all times in the reaction mixture and never exceeds the maximum limits for these components. A relatively small proportion of the circulating mass is withdrawn through conduit 216 through the upper portion of reactor 211 as the polymerization product of the process. From this effluent polymer oils are separated from unconverted solvent. The solvent recovered from the effluent is recycled to reactor 211 through conduit 214. In the method of operation of Figure 8 the mass of circulating material in reactor 211 is at least one hundred times the quantity of components injected therein. The injection of the feed and separate components may be effected continuously or intermittently, as desired.

As used in its broadest sense, the term "polymerization" includes copolymerization of the perhalo-olefins with other compounds; preferably other perhalo-olefins. The term "polymerization promoter" as used herein designates a substance unstable in that it at least partially decomposes and fragments thereof combine with the polymer thereby increases the rate of reaction and controls to a certain degree the ultimate chain length of the polymer.

We claim:

1. A process for the production of a normally liquid polymer of trifluorochloroethylene which comprises polymerizing trifluorochloroethylene at a temperature between about 70° C. and about 200° C. for time between about 1 minute and about 10 hours in the presence of benzoyl peroxide as a promoter and chloroform as a chain transfer solvent, the weight ratio of promoter to monomer being between about 1:15 and about 1:50 and the weight ratio of chain transfer solvent between about 10:1 and about 1:5 and maintaining the concentration of promoter and monomer within 10 per cent of their initial concentrations at substantially all times.

2. A process for producing polytrifluorochloroethylene oil which comprises introducing trifluorochloroethylene together with benzoyl peroxide as the promoter and chloroform as a solvent into one end of an elongated reaction zone, polymerizing trifluorochloroethylene in said reaction zone at a temperature between about 70° C. and about 200° C. under a pressure at least sufficient to maintain the monomer in the liquid phase for a sufficient residence time to obtain the polymer oil product, introducing additional monomer and promoter at spaced intervals longitudinally along the elongated reaction zone in an amount sufficient to maintain the concentrations of benzoyl peroxide and monomer within 10 per cent of the initial predetermined concentrations at substantially all times and recovering from the other end of said reaction zone an effluent comprising polytrifluorochloroethylene oil as a product of the process.

3. A continuous process for the production of perfluorochloro polymers which comprises polymerizing a perfluorochloroolefin under conditions of temperature and residence time in the presence of a peroxy polymerization promoter to produce a polymer of the perfluorochloroolefin, the initial concentration of said peroxy promoter being between about 0.01 and about 10 per cent based on monomer, and maintaining the concentration of the promoter within 10 per cent of said initial concentration at substantially all times with relation to the monomer by the addition of promoter during the polymerization.

4. A continuous process for the production of trifluorochloroethylene polymers which comprises polymerizing trifluorochloroethylene under conditions of temperature and residence time and in the presence of a polymerization promoter said polymerization promoter being selected from the group consisting of the alkyl peroxides, acyl peroxides, and the inorganic persulfates, perborates, perphosphates, and peroxides to produce a polymer of trifluorochloroethylene, the initial concentration of said polymerization promoter being between about 0.01 and about 10 per cent based on monomer, and maintaining the concentration of the promoter within 10 per cent of said initial concentration at substantially all times with relation to the monomer by the addition of promoter during the polymerization.

5. A continuous process for the production of a thermoplastic polymer of trifluorochloroethylene which comprises polymerizing trifluorochloroethylene at a temperature between about −20 and about 25° C. and at a residence time sufficient to polymerize a major proportion of the monomer in the presence of a peroxy polymerization promoter, the initial concentration of said peroxy polymerization promoter being between about 0.01 and about 0.5 weight per cent of the monomer, at a pressure in excess of the vapor pressure of the monomer such that a thermoplastic polymer of trifluorochloro-ethylene is produced and controlling the concentration of the polymerization promoter such that the concentration of the promoter during the polymerization does not vary more than 10 per cent from said initial concentration for more than 5 per cent of the polymerization time with relation to the monomer by the addition of promoter during the polymerization.

6. A continuous process for producing a normally liquid polymer of trifluorochloroethylene which comprises polymerizing trifluorochloroethylene at a temperature between about 70° C. and about 200° C. for a residence time sufficient to polymerize a major proportion of the monomer under liquid phase condition in the presence of an organic peroxide promoter and a chain transfer solvent, the weight ratio of promoter to monomer being between about 1:10 and about 1:200 and the weight ratio of chain transfer solvent to monomer being between about 10:1 and about 1:5, and controlling the concentration of promoter in the reaction mixture such that the concentration of the promoter does not vary more than 10 per cent from the initial concentration for more than 10 per cent of the polymerization time with relation to the monomer by the addition of promoter during the polymerization.

7. A continuous process for producing a low molecular weight polymer of trifluorochloroethylene corresponding to a molecular weight not higher than that of a wax having a melting point of 200° C. which comprises polymerizing trifluorochloroethylene at a temperature between about 70° C. and about 200° C. for a residence time sufficient to polymerize the monomer to said polymer in the presence of benzoyl peroxide as the promoter and a chain transfer solvent, the weight ratio of promoter to monomer being between about 1:10 and about 1:200 and the weight ratio of chain transfer solvent to monomer being between about 10:1 and about 1:5, and controlling the concentration of promoter with relation to monomer such that the concentration of the promoter does not vary more than 10 per cent from the initial concentration for more than 10 per cent of the time by the addition of benzoyl peroxide during the polymerization.

8. A continuous process for the production of perfluorochloro polymers which comprises polymerizing a perfluorochloroolefin under conditions of temperature and residence time in the presence of a peroxy polymerization promoter, the weight ratio of promoter to monomer being between about 1:10 and about 1:200, to produce a polymer of the perfluorochloroolefin and maintaining the concentration of promoter within 10 per cent of a predetermined initial concentration at substantially all times with relation to the monomer by addition of promoter during the polymerization.

9. The process of claim 8 in which the perfluorochloroolefin is trifluorochloroethylene.

10. The process of claim 8 in which the polymerization promoter is benzoyl peroxide.

11. The process of claim 8 in which the polymerization promoter is bis-trichloroacetyl peroxide.

12. The process of claim 8 in which the polymerization promoter is ammonium persulfate.

13. The process of claim 8 in which the polymerization promoter is potassium persulfate.

14. The process of claim 8 in which the polymerization promoter is di-t-butyl peroxide.

References Cited in the file of this patent

UNITED STATES PATENTS

| Number | Name | Date |
|---|---|---|
| 2,400,477 | Atwood | May 21, 1946 |
| 2,497,828 | Young | Feb. 14, 1950 |
| 2,531,134 | Kropa | Nov. 21, 1950 |

FOREIGN PATENTS

| Number | Country | Date |
|---|---|---|
| 465,520 | Great Britain | May 3, 1937 |

OTHER REFERENCES

Schmidt and Marlies: "High Polymer Theory and Practice," pages 126 and 127, McGraw-Hill (1948).